(12) United States Patent  
Huang et al.

(10) Patent No.: US 7,304,687 B2  
(45) Date of Patent: Dec. 4, 2007

(54) GHOST CANCELLATION SYSTEM USING WAVELET PROCESSED GHOST CANCELLATION REFERENCE SIGNAL

(75) Inventors: Albert Po-Hao Huang, Taoyuan (TW); Canny Hsueh-Hsian Liao, Taipei (TW)

(73) Assignee: Sony Taiwan Limited, Taipei (TW)

( * ) Notice: Subject to any disclaimer, the term of this patent is extended or adjusted under 35 U.S.C. 154(b) by 481 days.

(21) Appl. No.: 11/005,772

(22) Filed: Dec. 7, 2004

(65) Prior Publication Data

US 2006/0139495 A1 Jun. 29, 2006

(51) Int. Cl.
*H04N 5/21* (2006.01)
*H04N 5/213* (2006.01)

(52) U.S. Cl. ........................... 348/614; 348/611

(58) Field of Classification Search ............... 348/614, 348/21, 607, 608, 611, 612, 624; 375/286, 375/229, 230, 232; H04N 5/21, 5/213
See application file for complete search history.

(56) References Cited

U.S. PATENT DOCUMENTS

| 4,947,252 | A | 8/1990 | Kobayashi et al. |
| 5,121,211 | A | 6/1992 | Koo |
| 5,196,936 | A | 3/1993 | Kobayashi et al. |
| 6,952,238 | B2 * | 10/2005 | Koo ............................ 348/614 |
| 7,180,552 | B2 * | 2/2007 | Kim ............................ 348/614 |

* cited by examiner

*Primary Examiner*—Sherrie Hsia  
(74) *Attorney, Agent, or Firm*—Frommer Lawrence & Haug LLP; William S. Frommer; Thomas F. Presson

(57) ABSTRACT

Disclosed is a ghost cancellation system based on an enhanced ghost cancellation reference signal for noisy environments. The received analog television signal is first subjected to a digitization step for processing in the digital domain. A wavelet de-noising operation is applied on the reference signal to remove undesired noises before a communication channel is estimated, and filter coefficients are optimally determined. The digitized composite signals are then ghost-reduced by IIR and FIR filters. The power consumption and training time of the realized chip are decreased, which is ideal for mobile and platform applications.

7 Claims, 13 Drawing Sheets

| Field | Summation Sign | Field | Summation Sign |
|---|---|---|---|
| 1 | + | 5 | - |
| 2 | - | 6 | + |
| 3 | + | 7 | - |
| 4 | - | 8 | + |

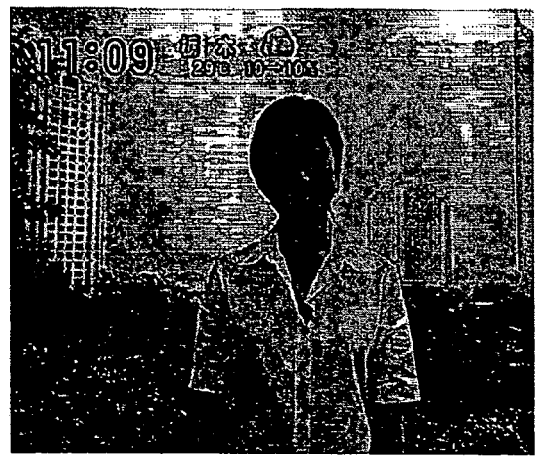
FIG. 8-A
FIG. 8-B
FIG. 8-C

GHOST CANCELLATION SYSTEM USING WAVELET PROCESSED GHOST CANCELLATION REFERENCE SIGNAL

BACKGROUND OF THE INVENTION

1. Field of the Invention

The present invention relates to a circuit for preprocessing a received ghost cancellation reference (GCR) signal in a received television signal, and then reducing television ghosts based on the enhanced GCR signal.

2. Description of the Related Art

In modem television transmission, echoes or ghosts have been one of the major problems. A multi-path phenomenon occurs when a transmitted signal is reflected from static objects such as mountains and buildings, or from dynamic objects such as clouds and airplanes, causing what is known as ghosts. This phenomenon is generally visible in terrestrial transmissions over air, but it could also occur over cable transmissions. The received signal consists of the usually post-cursory but sometimes pre-cursory, and attenuated copies of the transmitted signals overlapping with the strongest signal from a main path.

To assist in signal restoration, the Japanese Broadcasting Technology Association (BTA) has adopted a GCR signal based on an 8-field sequence of a time integral of a windowed [sin (x)/x] or sinc pulse. This same signal is also described in Section 1.1 of Annex 1 of Recommendation International Telecommunication Union Radio (ITU-R) BT.1124-3 as GCR Signal A. The GCR signal is transmitted on lines 18 and 281 of the 525-line television system. The sinc pulse extracted from the windowed sinc GCR signal has a flat frequency domain response desirable for channel compensation and equalization. However, U.S. Pat. No. 5,121,211 to Koo discloses that this BTA GCR signal suffers a performance limitation in high noise situation due to its low energy, and thus additional processing is required in this case.

U.S. Pat. No. 4,947,252 to Kobayashi, et al. applies Fourier transform to characterize the channel in the frequency domain for nearby and normal ghost cancellation. This processing circumvents the low energy characteristics in the time domain GCR signal in a high noise condition. However, the additional computation complexity and time is costly for tracking fast channel changes for this approach.

Further, U.S. Pat. No. 5,196,936 to Kobayashi, et al. suggested adding a plurality of sets of GCR signals together with noise level detection so that only when the ghost component exceeds the maximum detected noise level, should this component be considered effective for ghost cancellation. The problem with this solution is that is that at long intervals with sufficiently high estimated noise level, ghost detection will not feasible; thus, ghost cancellation will be rendered ineffective.

In order to solve the above problems, an advantageous solution is set forth in the present invention, in which the received GCR signal or the addition of a plurality of sets of GCR signals is first processed with a wavelet de-noising filter. Unlike a normal low pass filter where all details including edges are smoothed out, the wavelet de-noising filter smoothes out sufficient noise while preserving the edge information. This is important for obtaining the optimal waveform with differentiating the received GCR signal, from which ghost locations and levels are determined for the plurality of ghost cancellation filters that follows.

SUMMARY OF THE INVENTION

Therefore, the present invention has incorporated a novel wavelet de-noising filter to improve the channel estimation for analog TV's ghost reduction.

An object of the present invention is to provide a ghost cancellation system based on an enhanced ghost cancellation reference signal for noisy environments. A wavelet de-noising process is performed on the reference signal to remove undesired noises before a communication channel is estimated, and filter coefficients can be optimally determined.

In accordance with one aspect of the present invention, there is provided a ghost cancellation system for a television signal comprising an input terminal for receiving and digitizing an input television signal including a GCR signal with an analog-to-digital converter; a preprocessing unit for storing a plurality of the received digitized GCR waveforms for consecutive fields, and pre-conditioning the received digitized GCR waveforms by performing a wavelet de-noising operation to improve an S/N level of the GCR waveform; a channel estimation and filter training unit for characterizing a communication channel based on the received or pre-conditioned GCR waveforms and/or a stored predetermined GCR waveform, and determining optimal filter coefficients for a plurality of filters; a plurality of de-noising filters for reducing post-ghost echoes by passing the digitized signal through a plurality of transversal filters constituting the de-noising filters; a plurality of equalizing filters for reducing nearby ghost echoes by passing the ghost-reduced composite signal through a plurality of transversal filters constituting the equalizing filters; and an output terminal for providing an output video signal in digitized form and/or analog form with a digital-to-analog converter.

There is provided a ghost cancellation system for a television signal, further comprising means for performing a wavelet decomposition process of a GCR waveform to obtain wavelet coefficients; means for performing a thresholding process based on the decomposed wavelet coefficients; and means for performing a wavelet reconstruction process to obtain a de-noised GCR waveform.

There is provided a ghost cancellation system for a television signal, further comprising means for estimating communication channel characteristics based on a wavelet de-noised GCR waveform; and means for calculating optimal filter coefficients based on the resulting channel characteristics estimating results.

There is provided a ghost cancellation system for a television signal, further comprising a plurality of IIR delay registers for storing IIR delay parameters calculated with a wavelet de-noised GCR waveform; a plurality of IIR coefficient registers for storing IIR coefficients calculated with a wavelet de-noised GCR waveform; a plurality of FIR coefficient registers for storing FIR coefficients calculated with a wavelet de-noised GCR waveform; a plurality of de-ghost IIR filters and means for performing the MAC operation with the IIR coefficients; and a plurality of equalizing FIR filters and means for performing the MAC operation with the FIR coefficients.

In accordance with another aspect of the present invention, there is provided a pipeline ghost cancellation architecture for performing ghost cancellation for a television signal, comprising a pipeline counter for tracking the current pipeline stage and selecting corresponding coefficients from corresponding IIR delay parameter registers, IIR coefficient registers, and FIR coefficient registers; IIR delay parameter registers for storing IIR delay parameters; IIR coefficient registers for storing IIR coefficients; FIR coefficient registers for storing FIR coefficients; a data buffer for storing digitized data; means for performing an IIR MAC operation for IIR with registers for keeping track of intermediate pipeline values; means for performing an FIR MAC operation for FIR with coefficients supplied from FIR coefficient registers and data selected from the head of the data buffer, together with registers for keeping track of the intermediate pipeline values.

BRIEF DESCRIPTION OF THE DRAWINGS

The accompanying drawings, which are incorporated in and constitute a part of this specification, illustrate a preferred embodiment of the invention and, together with a general description of the invention given above, and the detailed description of the embodiment given below, serve to explain the principle of the invention, in which:

FIG. 8A is a decoded captured television image frame sample;

FIG. 8B is a decoded ghost-reduced television image frame sample with wavelet de-noising; and FIG. 8C is a decoded ghost-reduced television image frame sample without wavelet de-noising.

DETAILED DESCRIPTION OF PREFERRED EMBODIMENTS OF THE INVENTION

To eliminate echoes generated from the transmission of television signals, there are generally two steps involved. First, the characteristics of a communication channel need to be identified. From these characteristics, a sequence of inverse filter coefficients is determined. The television signals from a receiver are then filtered with these determined coefficients, and thus ghost cancellation can be achieved. Due to the existence of noise, on top of the ghost echoes, in the received television signal, it is often difficult to perform the channel characterization efficiently and accurately. Therefore, a preprocessing circuit for increasing the received S/N ratio of the received television signal is proposed in this invention.

Figure 1:
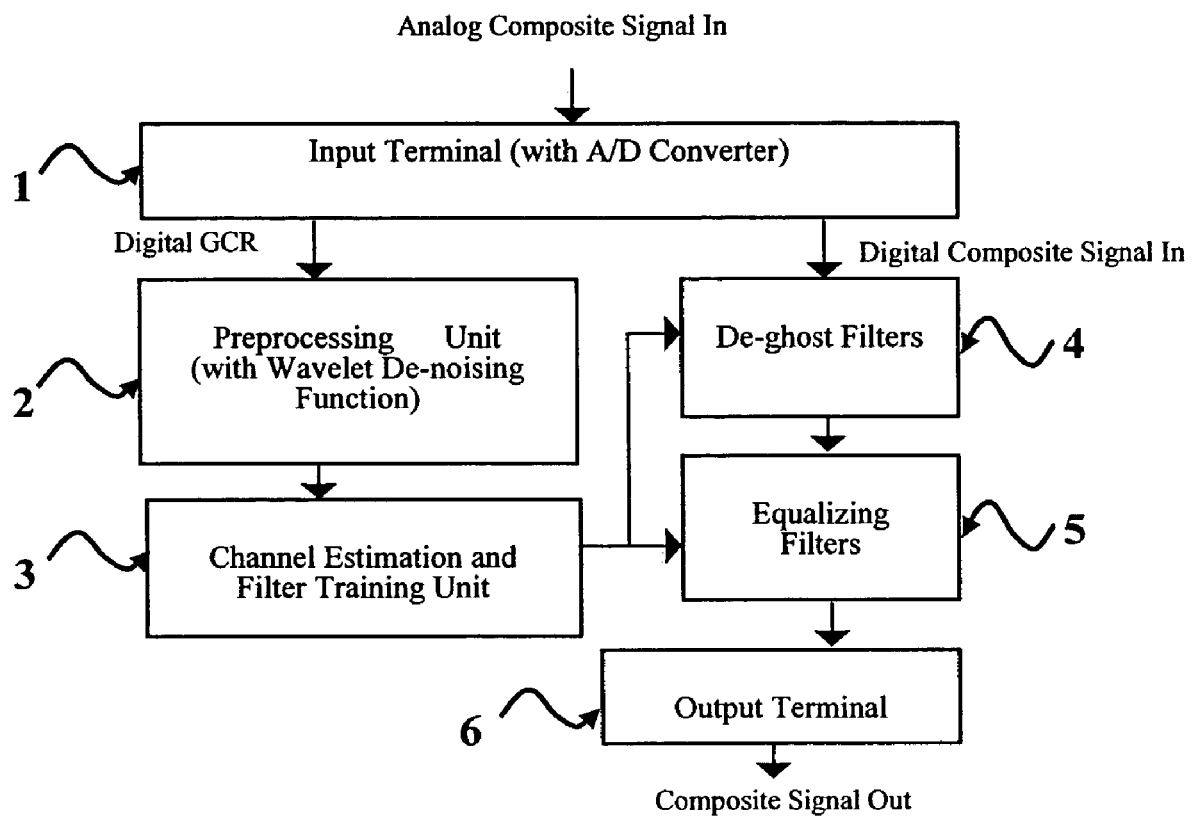
FIG. 1 is a block diagram of a ghost cancellation system in accordance with the present invention.

FIG. 1 shows a schematic block diagram of a ghost cancellation system in accordance with the present invention. As shown in FIG. 1, the ghost cancellation system primarily comprises an input terminal 1 having an analog-to-digital converter (hereinafter referred to as an A/D converter) therein, a preprocessing unit 2, a channel estimation and filter training unit 3, de-ghost filters 4, equalizing filters 5, and an output terminal 6 with or without a digital-to-analog converter (hereinafter referred to as a D/A converter) therein, and can be a part of a television receiver, which receives television signals comprising a GCR signal. A tuner of the television receiver receives an analog composite signal including the GCR signal from the television broadcast. The received analog signal is analog-to-digital converted by the A/D converter in the input terminal 1 for subsequent processing. The digitized GCR signal is then supplied to the preprocessing unit 2, which is used to increase the supplied GCR signal S/N (i.e., signal-to-noise) level with a wavelet de-noising functions. The channel estimation and filter training unit 3 extracts the information pertinent to the channel characterization, determines a sequence of inverse channel filter coefficients, and passes the resulting signal to the de-ghost filters 4 and the equalizing filters 5. The de-ghost filters 4 are composed of a plurality of transversal filters which are used to reduce post-ghost occurrences, and the equalizing filters 5 are composed of a plurality of transversal filters which are used to equalize nearby ghost occurrences. The resulting signal is then supplied to the output terminal 6 for performing a digital-to-analog conversion if required; and thus a composite signal is produced and outputted.

A preferred embodiment of a ghost cancellation system in accordance with the present invention and the operation thereof will be described with reference to FIG. 2 through FIG. 5D.

Figure 2:
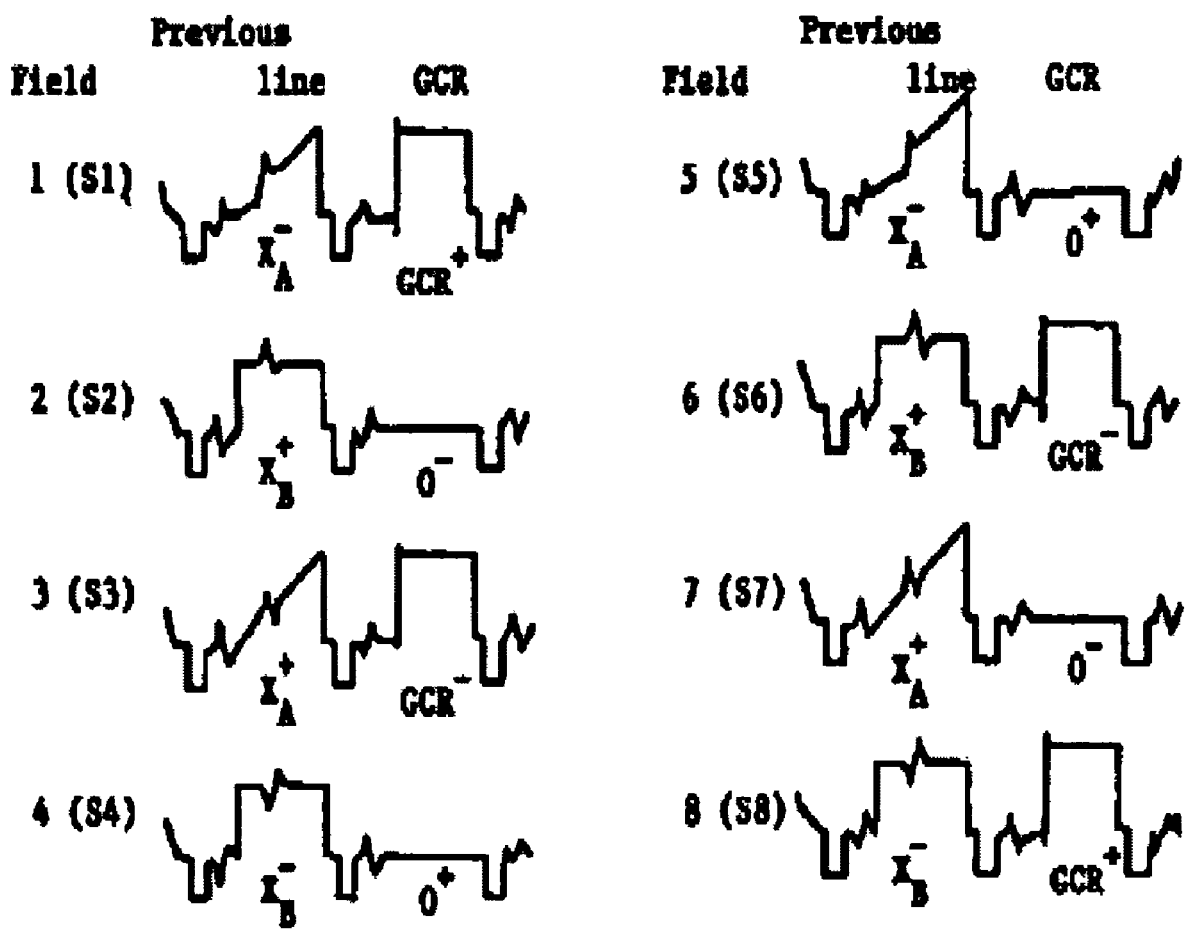
FIG. 2 is an 8-field sequence of a GCR signal.
Figure 3:
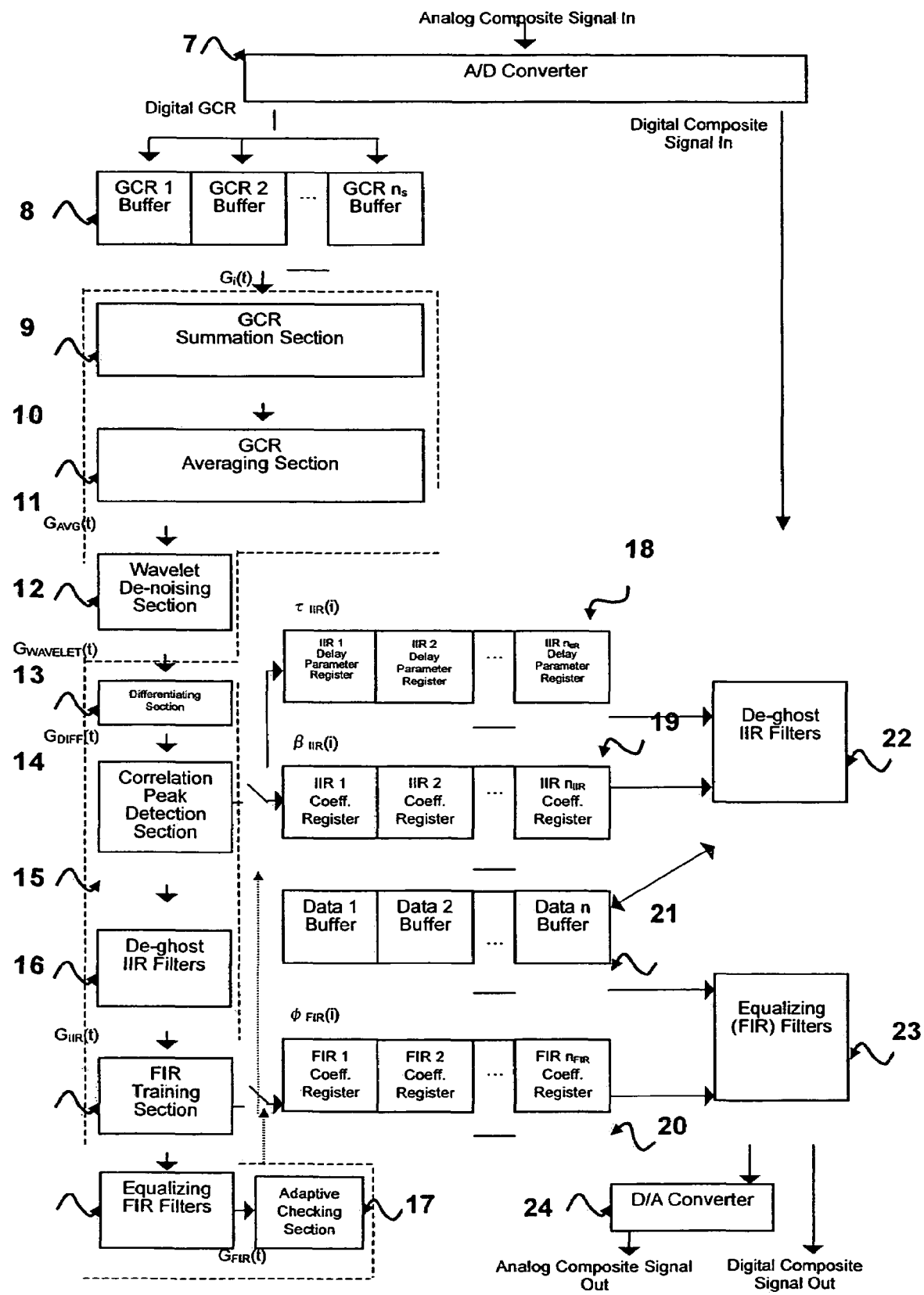
FIG. 3 is a preferred embodiment of a ghost cancellation system in accordance with the present invention.
Figure 4A:
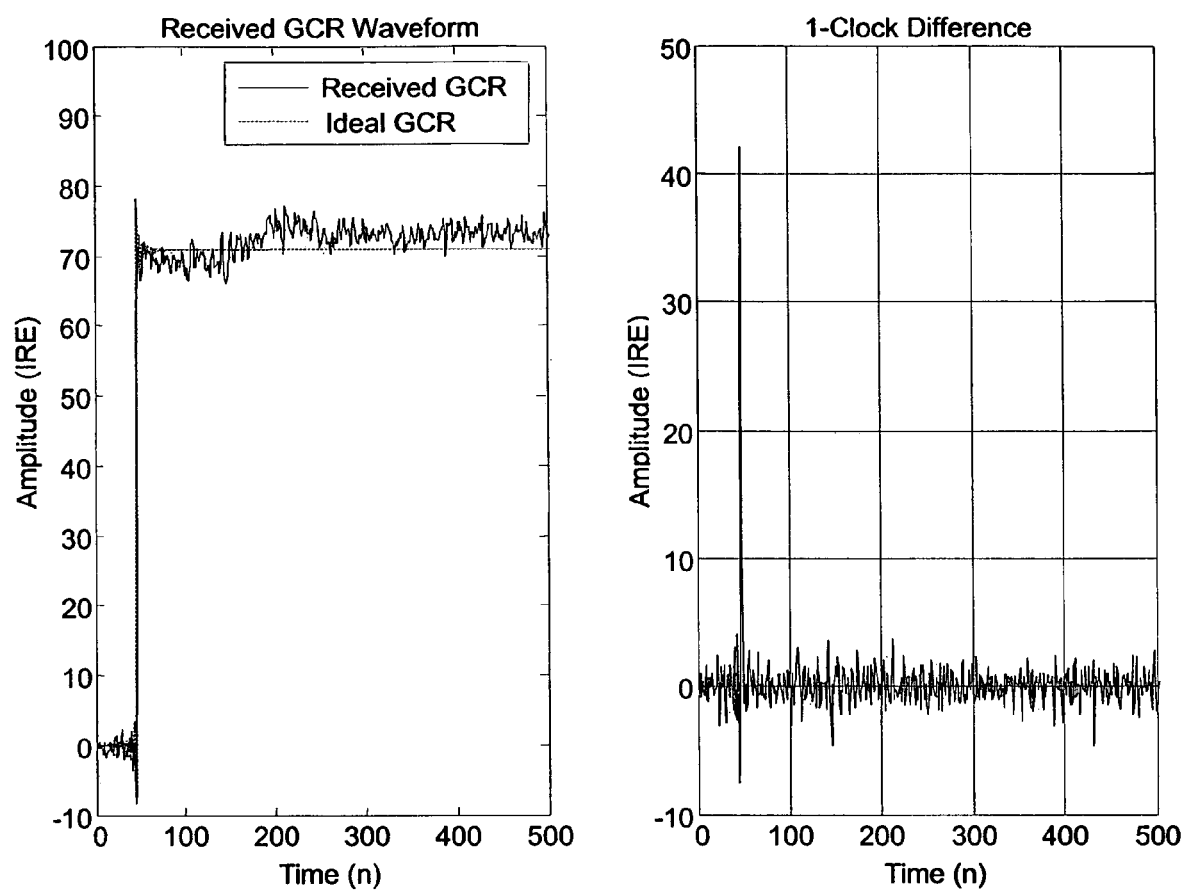
FIG. 4A is a sample received GCR waveform, and the one clock difference.
Figure 4B:
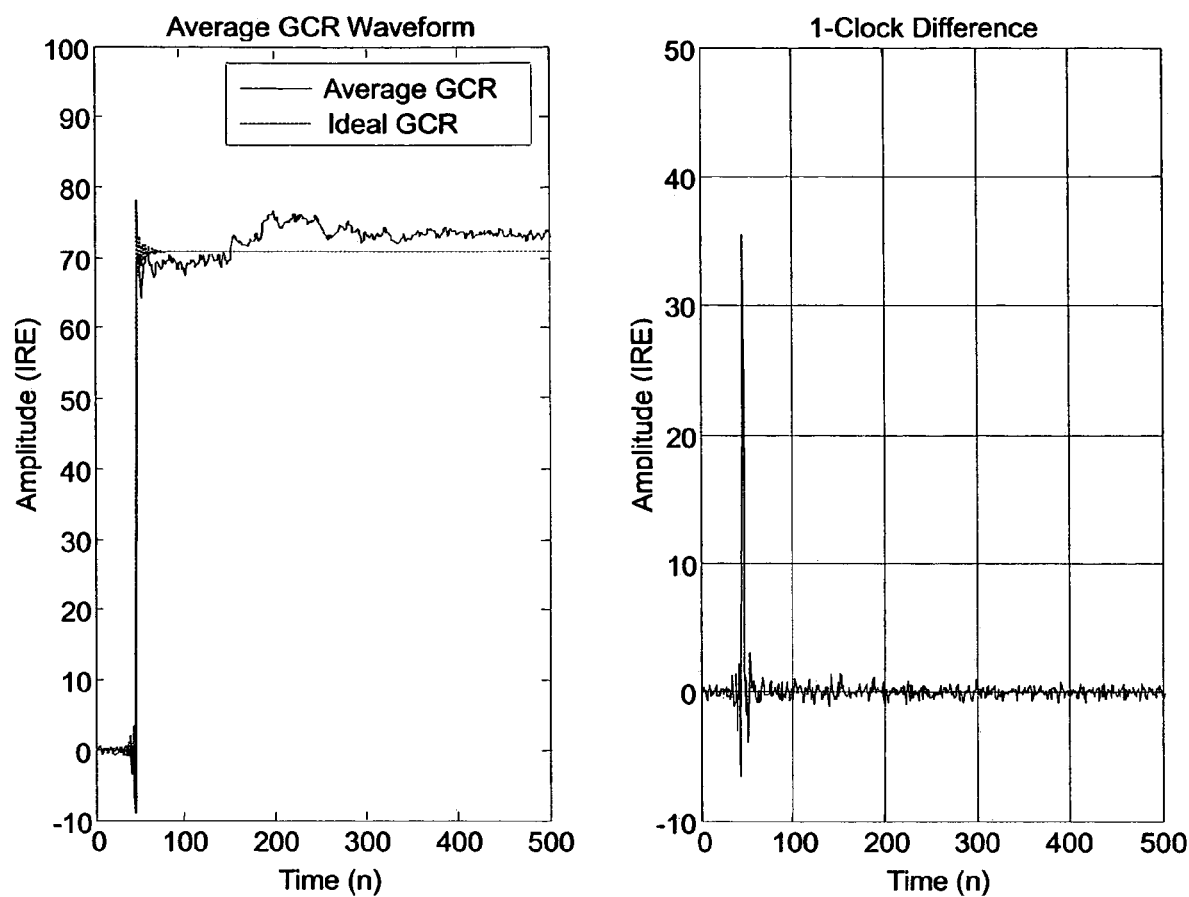
FIG. 4B is a sample GCR waveform after averaging, and the one clock difference.
Figure 4C:
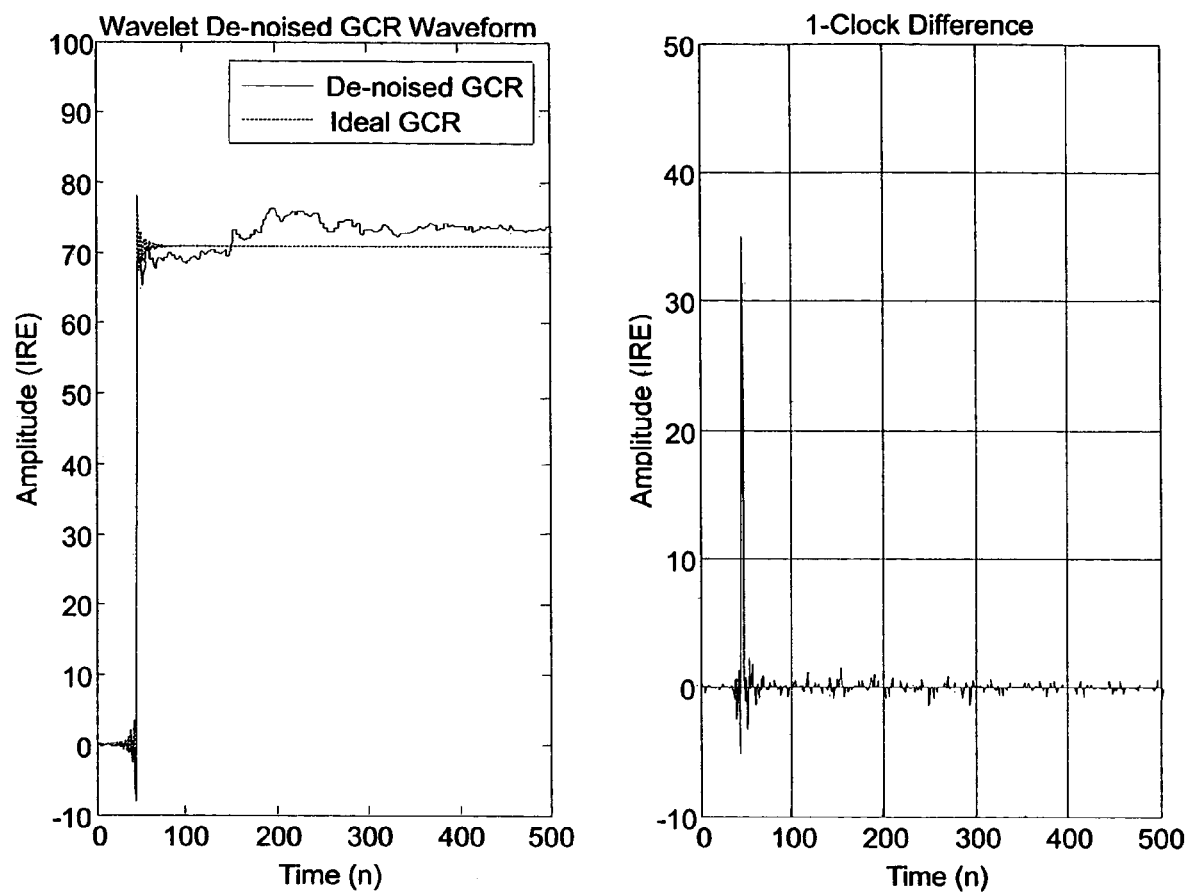
FIG. 4C is a sample GCR waveform after wavelet de-noising, and the one clock difference.
Figure 5A:
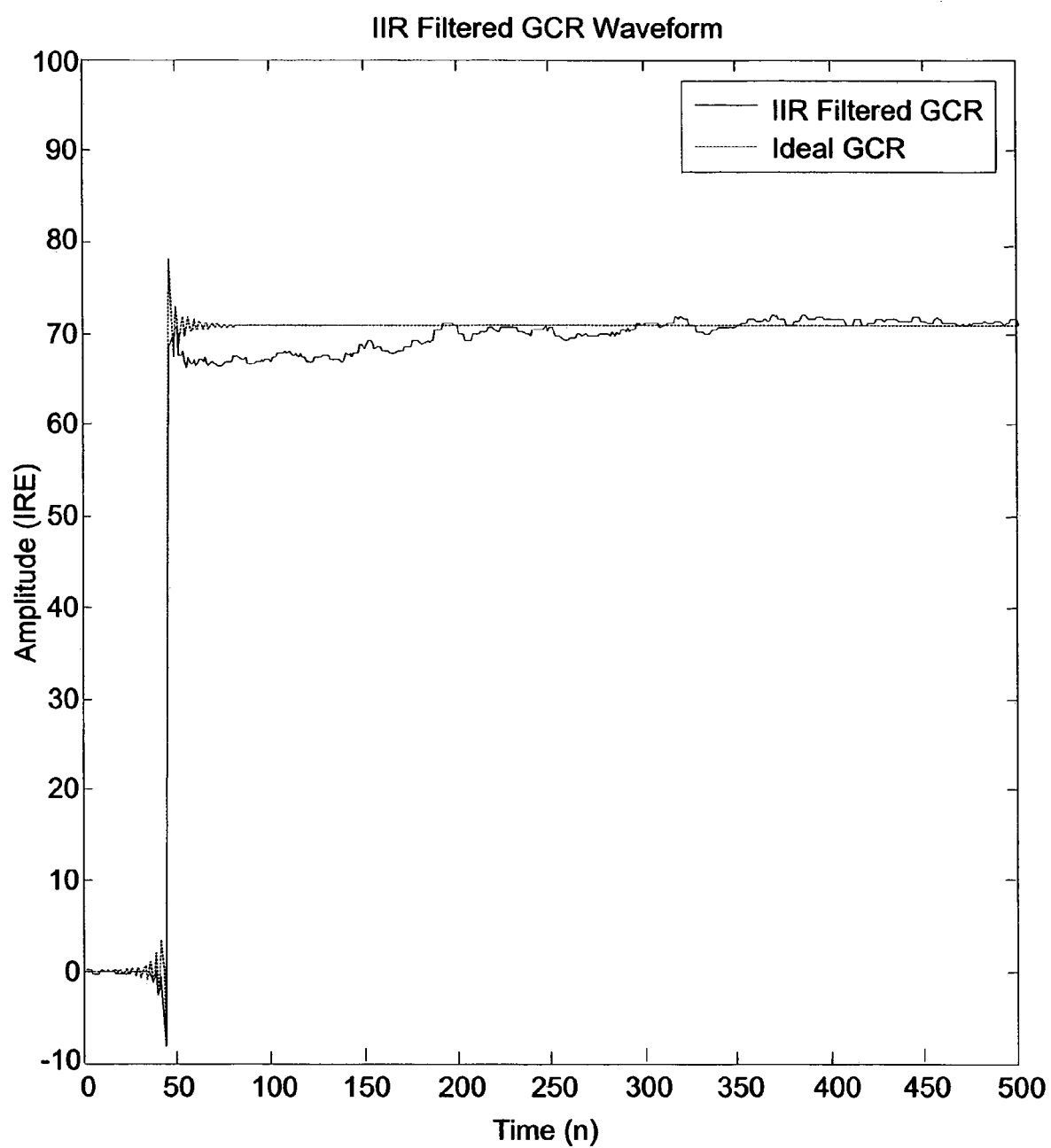
FIG. 5A is a sample GCR waveform, after IIR filtering with wavelet de-noising.
Figure 5B:
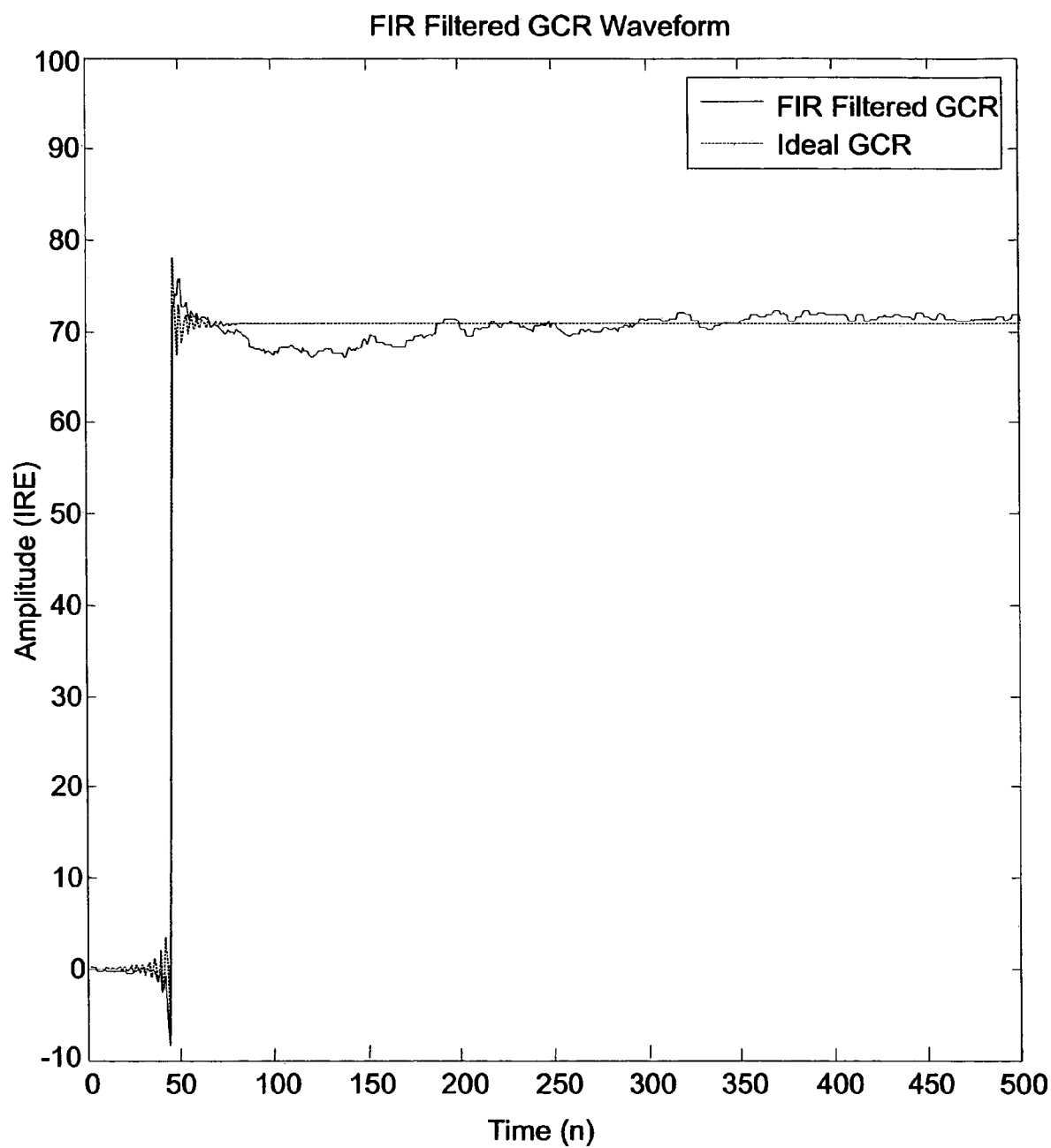
FIG. 5B is a sample GCR waveform, after FIR filtering with wavelet de-noising.
Figure 5C:
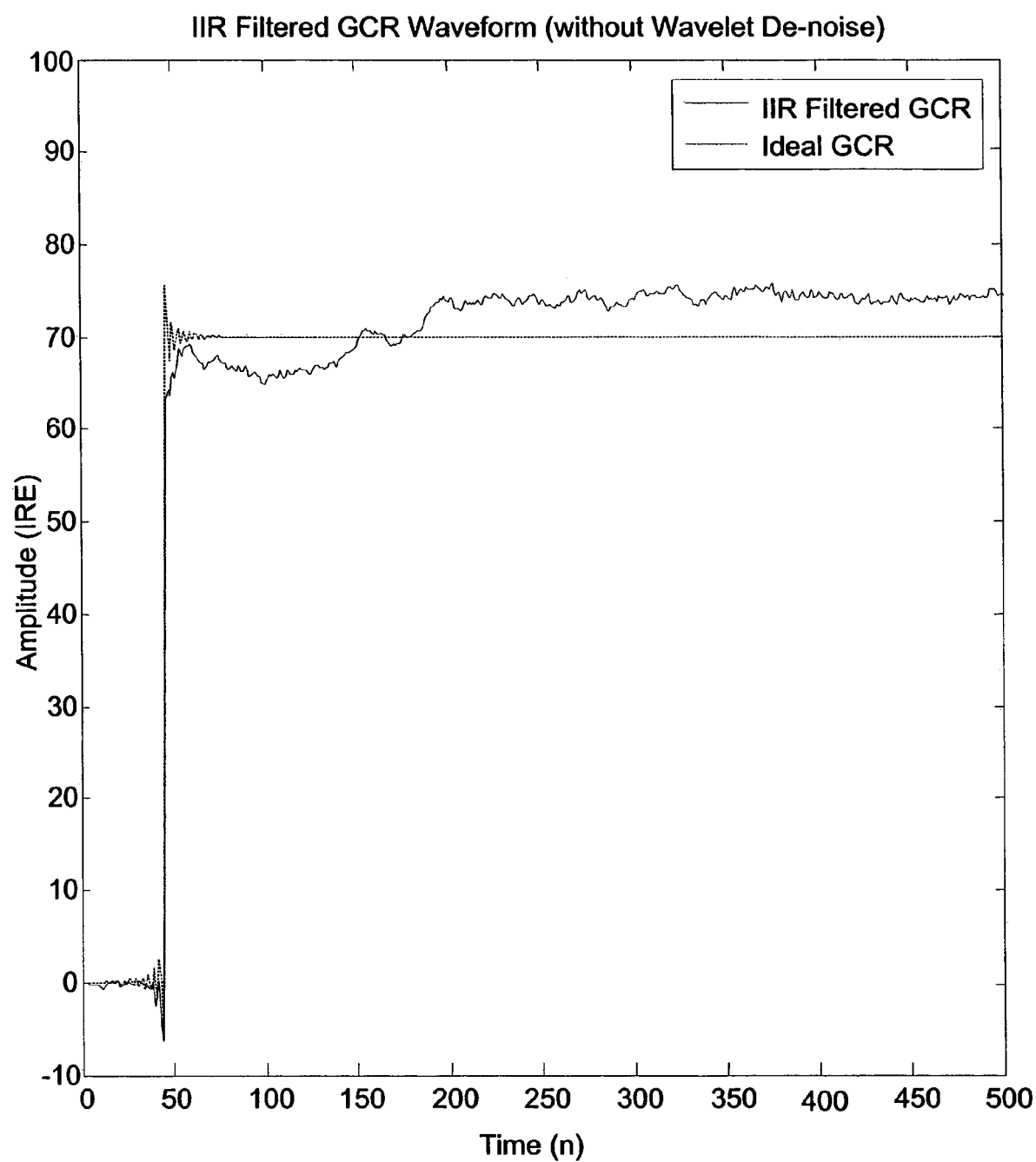
FIG. 5C is a sample GCR waveform, after IIR filtering without wavelet de-noising.
Figure 5D:
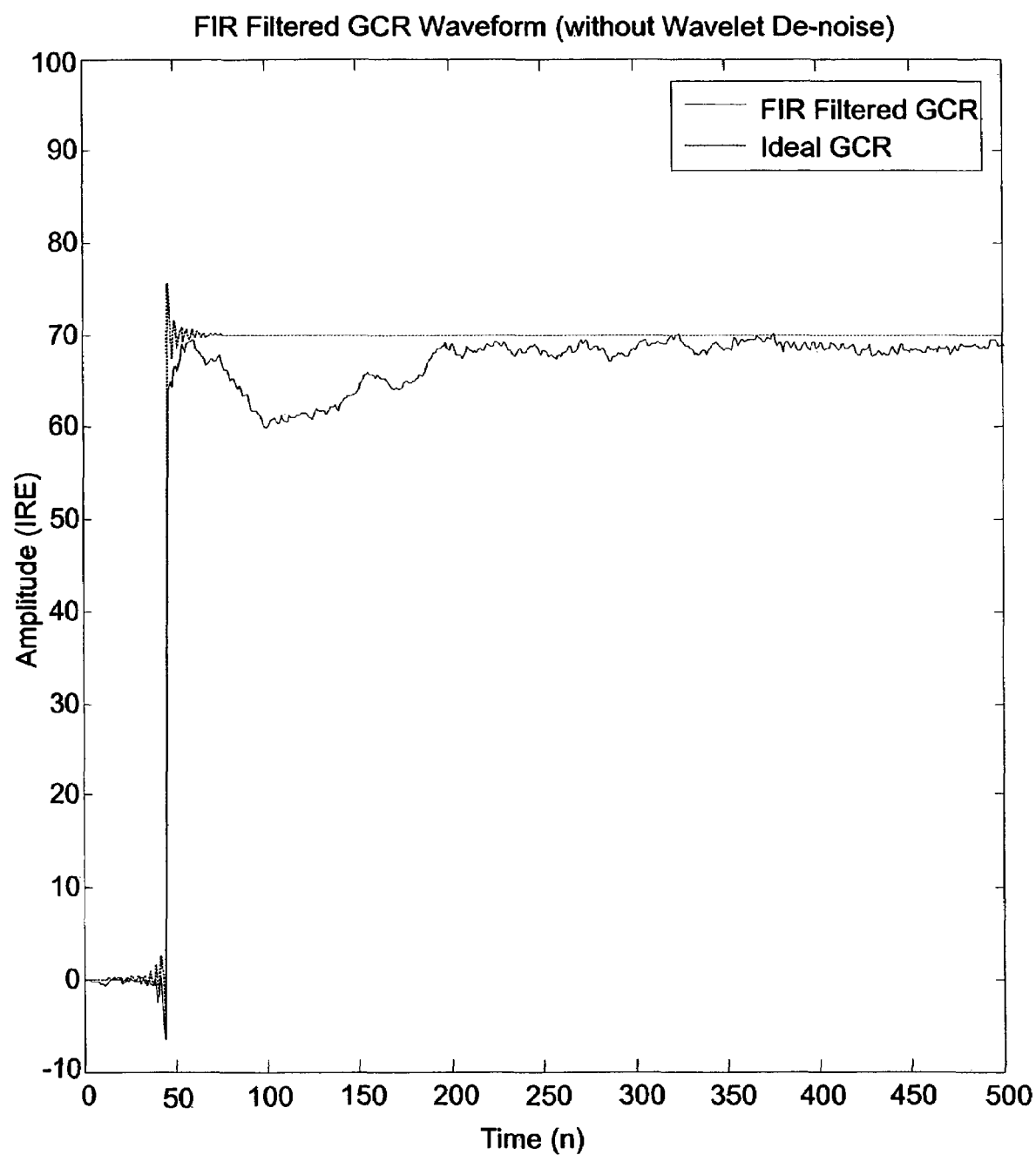
FIG. 5D is a sample GCR waveform, after FIR filtering without wavelet de-noising.

FIG. 2 shows an 8-field sequence of the GCR signal. FIG. 3 shows an embodiment of a ghost cancellation system in accordance with the present invention. As shown in FIG. 3, the television signals are received from the tuner and input to an A/D converter 7. A digital GCR signal, which is transmitted in the vertical blanking interval of the signal, is stored in line buffers 8 comprised of a GCR 1 buffer, a GCR 2 buffer, . . . , and a GCR $n_s$ buffer. FIG. 4A illustrates one sample of a received GCR waveform. These stored GCR lines from 8 fields or sets of 8 fields, with their respective signs, are summed together and averaged by applying equation 1. A GCR summation section 9 is provided to perform a GCR summation operation to remove the ghost echoes from the horizontal sync and the color burst on the GCR line. A GCR averaging section 10 is provided to perform a GCR averaging operation to reduce the additive white Gaussian noise and to improve the S/N level of the received GCR signal. FIG. 4B illustrates the GCR waveform after the averaging operation is performed.

$$G_{AVG}(t) = \frac{1}{n_S} \sum_{j=0}^{n_S-1} \left[ \frac{1}{4} \sum_{i=0}^{3} (\pm G_i(t) \mp G_{i+4}(t)) \right] \quad (1)$$

where $G_{AVG}(t)$ is the averaged GCR waveform, $n_S$ is the number of 8-field sequence sets, and $G_i(t)$ is the i-th received GCR waveform within a 8-field sequence set. Since a sinc pulse is produced by the differentiation of the transmitted GCR signal by applying equation 2, a single post-ghost echo shows up in the received GCR difference signal as a delayed and attenuated sinc pulse. Taking the normalized correlation of the difference GCR signal, e.g. autocorrelation (by applying equation 3), the randomness in the data is removed and the power of the non-random ghost echoes is detected by using a peak detection method. However, in many cases, the random noise level is too high for the non-randomness to be uncovered. Thus, further improvement of the S/N level is required.

$$G_{DIFF}(t) = G_{AVG}(t) - G_{AVG}(t - \tau_{DIFF}) \quad (2)$$

where $G_{DIFF}(t)$ is the differentiated GCR, $G_{AVG}(t)$ is the averaged GCR, and $T_{DIFF}$ is the clock differentiation interval.

$$R_{GG}(\tau) = \frac{1}{R_{GG}(0)} \sum_{i=0}^{N_S} [G_{DIFF}(t) \times G_{DIFF}(t + \tau)] \quad (3)$$

where $R_{GG}(T)$ is the autocorrelation of $G_{DIFF}(t)$, $N_S$ is number of GCR sample points, and T is correlation lag. A wavelet de-noising section 11 is provided to perform a wavelet de-noising function to further enhance the averaged GCR signal before the above processes can be taken. Using a wavelet decomposition process of the GCR waveform (using Haar wavelet in this example with normalized low-pass coefficients of $$\left[ \frac{1}{\sqrt{2}}, \frac{1}{\sqrt{2}} \right]$$

and normalized high-pass coefficients of $$\left[ \frac{1}{\sqrt{2}}, \frac{-1}{\sqrt{2}} \right],$$

repeating the decomposition twice for level of 2), a soft thresholding process (i.e., equation 4) based on the coefficients obtained either at the first or at each wavelet decomposition level, is applied to each decomposition level. A GCR waveform reconstruction process, which is an inverse process of the wavelet decomposition process, is thus made de-noised as shown in FIG. 4C.

$$C_{RECON}(i) = \begin{array}{l} sgn(C_{DEC}(i)) \times [|C_{DEC}(i)| - \alpha], \text{ if } |C_{DEC}(i)| > \alpha \\ 0, \text{ else} \end{array} \quad (4)$$

$$\alpha = 0.3936 + 0.1829 \times \frac{\log(N_s)}{\log(2)} \times \frac{median(|C_{HIGH}|)}{0.6745}$$

where $C_{RECON}$ is the reconstruction coefficients, $C_{DEC}$ is the decomposition coefficients, and $C_{HIGH}$ is high frequency decomposition coefficients. Then, a differentiating section 12 performs a differentiation operation on the GCR waveform, and an autocorrelation operation (i.e., equation 5) is performed. The major peak occurrences are identified in a correlation peak detection section 13 as the occurrence of ghost echoes by using the peak detection method. The time lags and the inverse of the peak magnitudes are stored as the delay and coefficients for the IIR filter circuit.

$$R_{GG}(\tau) = \frac{1}{R_{GG}(0)} \sum_{i=0}^{N_S} [G_{WAVELET}(t) \times G_{WAVELET}(t - \tau)] \quad (5)$$

where $R_{GG}(T)$ is the autocorrelation of $G_{WAVELET}(t)$, $N_S$ is number of GCR sample points, and T is correlation lag, $G_{WAVELET}(t)$ is the wavelet de-noised GCR waveform. The received and averaged GCR waveform is then filtered through the plurality of de-ghost IIR filters 14 with the lags and coefficients obtained. This removes the post-ghost echoes from the received GCR waveform. FIG. 5A shows the GCR waveform after an IIR filtering operation is performed. The IIR filtering operation is performed according to equation 6. The delay range determines the post-ghost detection range performance of the overall ghost cancellation system.

$$G_{IIR}(t) = \sum_{i=0}^{n_{IIR}-1} \beta_{IIR}(i) \times G_{IIR}(t - \tau_{IIR}(i)) \quad (6)$$

where $G_{IIR}(t)$ is the IIR filtered GCR waveform, $n_{IIR}$ is the number of IIR taps, $\beta_{IIR}(i)$ is the i-th IIR coefficient, and $T_{IIR}(i)$ is the i-th IIR delay. To further equalize the GCR waveform so as to reduce nearby ghost echoes, a plurality of equalizing FIR filters 16 can be provided (i.e., equation 7) with the filter coefficients trained by an FIR training section 15, such as the well-known Least-Mean-Square (LMS) algorithm against a stored copy of the predetermined GCR waveform. The number of taps of the FIR also affects a ghost detection range of the ghost cancellation system. FIG. 5B shows the GCR waveform after an FIR filtering operation is performed. The improvement in the GCR waveform equalization is evident when comparing with the GCR waveforms shown in FIG. 5C and FIG. 5D, respectively.

$$G_{FIR}(t) = \sum_{i=0}^{n_{FIR}-1} \Psi_{FIR}(i) \times G_{IIR}(t - i) \quad (7)$$

where $G_{FIR}(t)$ is the FIR filtered GCR waveform, $G_{IIR}(t)$ is the IIR filtered GCR waveform, $n_{FIR}$ is the number of FIR taps, and $\psi_{FIR}(i)$ is the i-th FIR coefficient. This completes a filter training process. A plurality of IIR delay parameter registers 18 (comprised of an IIR 1 delay parameter register, an IIR 2 delay parameter register, ..., and an IIR $n_{IIR}$ delay parameter register), IIR coefficient registers 19 (comprised of an IIR 1 coefficient register, an IIR 2 coefficient register, ..., and an IIR $n_{IIR}$ coefficient register), and FIR coefficient registers 20 (comprised of an FIR 1 coefficient register, an FIR 2 coefficient register, ..., and an FIR $n_{FIR}$ coefficient register) are provided to store the obtained IIR delay parameters, IIR coefficients, and FIR coefficients. An adaptive checking section 17 is provided to enable that the register updates only when the filtering process has reduced the overall GCR artifacts; otherwise, default filter values are used. When the next vertical sync is detected, the ghost cancellation system is updated with the new coefficients, the incoming digitized data is then processed through a plurality of de-ghost IIR filters 22 and then a plurality of equalizing FIR filters 23.

Figure 6:
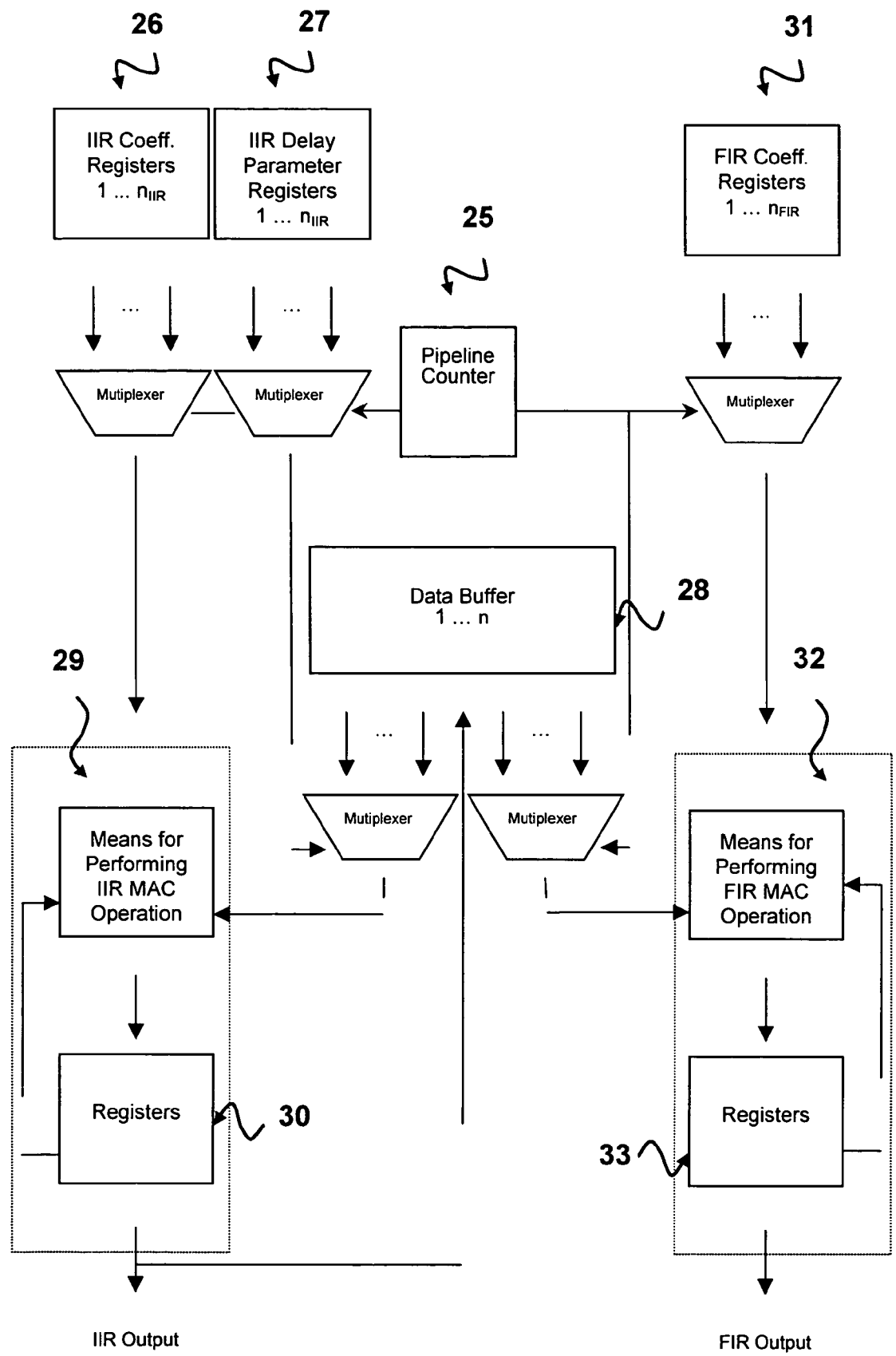
FIG. 6 is a block diagram of a pipeline IIR and FIR architecture.

In each cycle, a digitized data is fed into the de-ghost IIR filters 22. The data processed by the corresponding pervious IIR filter is fetched from a data buffer 21 (which is FIFO data buffer comprised of a data 1 buffer, a data 2 buffer, . . . , and a data n buffer) according to the IIR delay parameters stored in the IIR delay parameter registers 18 by using a plurality of up to $n_{IIR}$ n-to-1 multiplexers (as shown in FIG. 6). The de-ghost IIR filters 22 perform an MAC (Multiply-and-Accumulate) function with these previously processed IIR data and the corresponding IIR coefficients from the IIR coefficient registers 19. The result generated from these MAC operations is then stored to the head of the FIFO data buffer 21. This buffering of the IIR filtered data is required for up to a maximum IIR or FIR delay range.

The equalizing FIR filters 23 also fetch the IIR processed data from the data buffer 21 and perform the MAC function with the corresponding FIR coefficients stored in the FIR coefficient registers 20, but the filters only require a specific number of consecutive data from the head of the data buffer 21, unlike the variable delayed data required by the IIR above. The filtered data is then outputted as digital data or as analog data via a D/A converter 24.

To reduce the number of multiplier and adder circuits in the IIR and FIR filters, both filters can be designed to run on several times higher than the video input frequency. As a result, the actual number of multiplier and adder implemented can be reduced to $$\left\lceil \frac{n_{TAP}}{x_{FREQ}} \right\rceil,$$

where $n_{TAP}$ is the total number of filter taps in a filter and $X_{FREQ}$ is the ratio of the running frequency and the input frequency.

Figure 7:
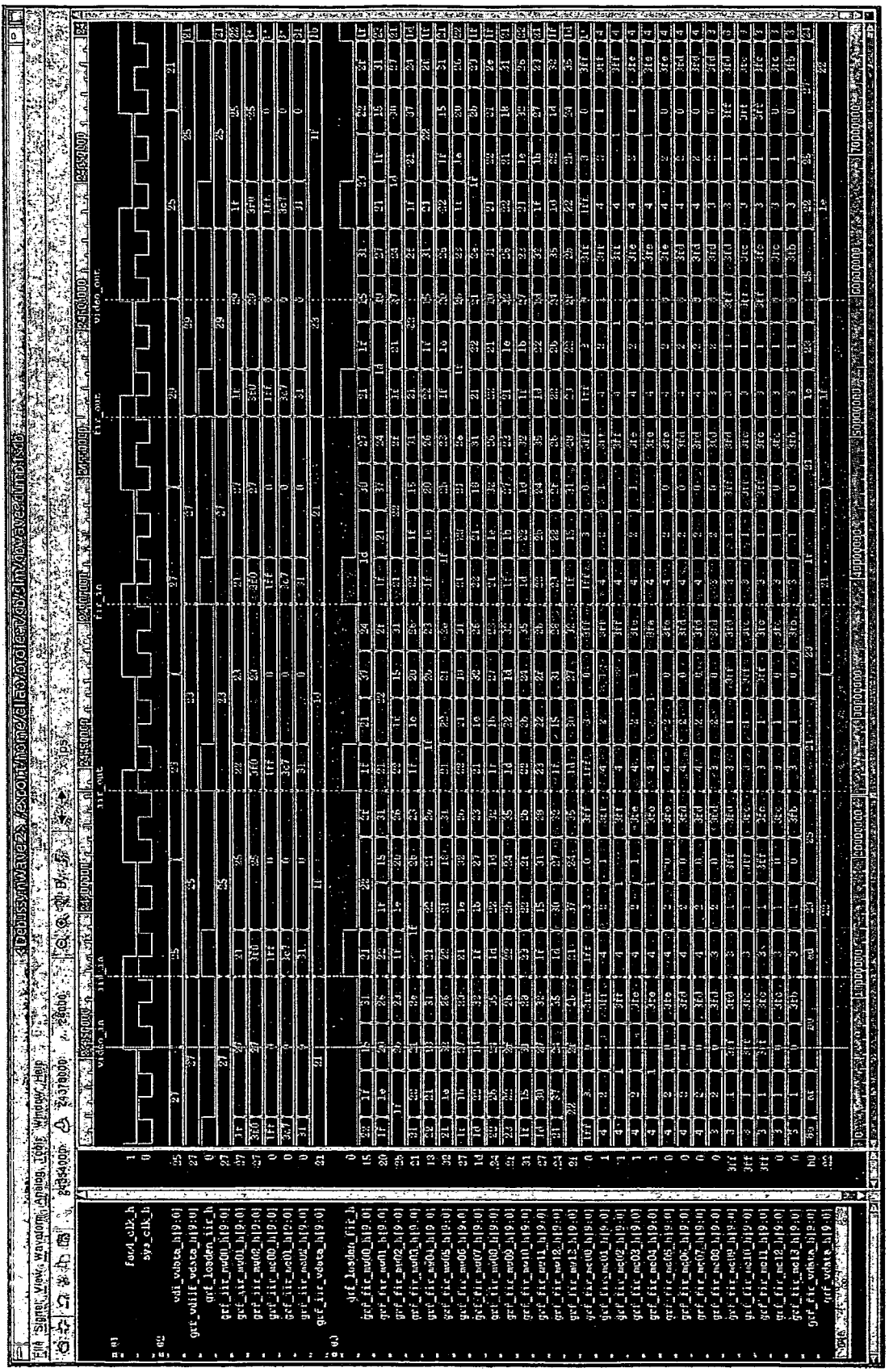
FIG. 7 is a timing diagram of a pipeline IIR and FIR architecture.

FIG. 6 shows a pipeline IIR and FIR architecture. FIG. 7 shows a timing diagram of a pipeline IIR and FIR operation. With reference to FIGS. 6 and 7, data synchronized to [fsc4_clk_h] enters as [vdi_vdata_h] and is fed into the IIR synchronized to [sys_clk_h] by [grf_loaden_iir_h]. A pipeline counter 25 tracks the current pipeline stage and selects the corresponding coefficients [grf_iir_mc_h] from the corresponding IIR delay parameter registers 27, IIR coefficient registers 26 and FIR coefficient registers 31. The IIR delays selected are then used to multiplex the appropriate data [grf_iir_mw_h] from a data buffer 28. Means for performing an IIR MAC operation 29 then performs the IIR MAC operation for IIR with registers 30 for keeping track of the intermediate pipeline values. The IIR output [grf_iir_vdata_h] of the final pipeline stage is then stored in the head of the data buffer 28. For the FIR operation commencing at [grf_loaden_fir_h], means for performing an FIR MAC operation 32 performs the FIR MAC operation with the coefficients [grf_fir_mc_h] supplied from FIR coefficient registers 31 and the data [grf_fir_mw_h] selected from the head of the data buffer 28, together with registers 33 for keeping track of the intermediate pipeline values. The FIR output [grf_fir_vdata_h] of the final pipeline stage is then outputted [grf_vdata_h].

FIG. 8A shows a NTSC decoded captured television image frame and FIG. 8B shows a NTSC decoded ghost-reduced television image frame from digitized interlaced composite signals with wavelet de-noising. The result shows a sharper and clearer television image with significantly reduced ghost artifacts when comparing with FIG. 8C, a NTSC decoded ghost-reduced television image frame from digitized interlaced composite signals without wavelet de-noising. The face of the reporter is cleaner and the ghost echoes of the head are reduced.

In addition, since the processing requirement of the invention is remarkably reduced as compared with the prior arts, the hardware complexity is thus reduced. Existing arts require 200 to 600 filter taps for effective ghost cancellation while the invention performs equally with 70 filter taps. This great reduction in hardware requirements, and thus the reduction in MAC operations, allows for significant reduction in power consumption of the resulting ghost cancellation chip—an estimate of 125 mW power consumption of the invention on 0.13 µm processes compared with 1000 mW power consumption of the existing arts on 0.25 µm processes. The filter training time required is also minimized, making fast and adaptive filter coefficient updates possible. The invention claims approximately 45 MIPS (Million Instructions Per Second) requirements for a filter training operation. This allows for tracking of the varying communication channel in about 1 second time with a fixed-point processor running at 45 MHz; thus constantly maintaining a high level of analog television reception and visual quality.

If the invention were to be realized, it could be applied to various stilled platforms such as televisions, video players with television tuner, set-top boxes, computer television tuner cards, television tuner boxes, and video gaming console with television reception capability. Due to the above-mentioned advantages of the invention, this invention could also be applied to mobile platforms. With the development of silicon tuner chip for analog television, devices such as PDA, smart phones, mobile phones, automobile television or multimedia players can be used to receive television signal on the go. As a result of the mobile nature of these devices, ghost echoes for analog terrestrial television transmission are unavoidable. The invention, with its low power and fast training characteristics, is ideal for compensating and reducing these ghosting artifacts.

While the present invention has been described in detail with reference to the specific embodiments and pictorially in the accompanying drawings, it is understood that the description is only illustrative of the invention and not to be construed as limiting the invention. Many modifications and variations, such as varying IIR or FIR configuration and channel estimation methods based on the wavelet de-noised GCR waveforn, can be derived to those skilled in the art without departing from the true spirit and scope of the invention.

What is claimed is:

1. A ghost cancellation system for a television signal, comprising:
   an input terminal (1) for receiving and digitizing an input television signal including a GCR signal with an analog-to-digital converter;
   a preprocessing unit (2) for storing a plurality of the received digitized GCR waveforms for consecutive fields, and pre-conditioning the received digitized GCR waveforms by performing a wavelet de-noising operation to improve an S/N level of the GCR waveform;
   a channel estimation and filter training unit (3) for characterizing a communication channel based on the received or pre-conditioned GCR waveforms and/or a stored predetermined GCR waveform, and determining optimal filter coefficients for a plurality of filters;

a plurality of de-noising filters (4) for reducing post-ghost echoes by passing the digitized signal through a plurality of transversal filters constituting the de-noising filters;

a plurality of equalizing filters (5) for reducing nearby ghost echoes by passing the ghost-reduced composite signal through a plurality of transversal filters constituting the equalizing filters; and an output terminal (6) for providing an output video signal in digitized form and/or analog form with a digital-to-analog converter.

2. The ghost cancellation system as claimed in claim 1, further comprising:

means for performing a wavelet decomposition process of a GCR waveform to obtain wavelet coefficients;

means for performing a thresholding process based on the decomposed wavelet coefficients; and means for performing a wavelet reconstruction process to obtain a de-noised GCR waveform.

3. The ghost cancellation system as claimed in claim 1, further comprising:

means for estimating communication channel characteristics based on a wavelet de-noised GCR waveform; and means for calculating optimal filter coefficients based on the resulting channel characteristics estimating results.

4. The ghost cancellation system as claimed in claim 1, further comprising:

a plurality of IIR delay registers (18) for storing IIR delay parameters calculated with a wavelet de-noised GCR waveform;

a plurality of IIR coefficient registers (19) for storing IIR coefficients calculated with a wavelet de-noised GCR waveform;

a plurality of FIR coefficient registers (20) for storing FIR coefficients calculated with a wavelet de-noised GCR waveform;

a plurality of de-ghost IIR filters (22) and means for performing the MAC operation with the IIR coefficients; and a plurality of equalizing FIR filters (23) and means for performing the MAC operation with the FIR coefficients.

5. A channel estimation process for performing ghost cancellation for a television signal based on optimal filter coefficients calculated based on a wavelet de-noised GCR waveform, comprising:

a GCR summation process for removing ghost echoes from a horizontal sync and a color burst on a GCR line;

a GCR averaging process for reducing additive white Gaussian noise and improving the S/N level of a received GCR signal;

a wavelet de-noising process for further enhancing the averaged GCR signal before the GCR summation process and GCR averaging process are taken;

a peak detection process for identifying major peak occurrences as the occurrence of ghost echoes;

an IIR filtering process for filtering the received and averaged GCR waveform to remove post-ghost echoes from the received GCR waveform; and an FIR filtering process for equalizing the GCR waveform to reduce nearby ghost echoes.

6. A ghost cancellation circuit for performing ghost cancellation for a television signal, comprising:

IIR delay parameter registers for storing IIR delay parameters;

IIR coefficient registers for storing IIR coefficients;

FIR coefficient registers for storing FIR coefficients;

a data buffer for storing digitized data;

de-ghost IIR filters for receiving and processing the digitized data from the data buffer, performing an MAC operation with previously processed IIR data, and the corresponding IIR coefficients from the IIR coefficient registers, and storing the result into the head of the data buffer; and equalizing FIR filters for fetching the IIR processed data from the data buffer and performing the MAC operation with the corresponding FIR coefficients stored in the FIR coefficient registers.

7. A pipeline ghost cancellation architecture for performing ghost cancellation for a television signal, comprising:

a pipeline counter (25) for tracking the current pipeline stage and selecting corresponding coefficients from corresponding IIR delay parameter registers, IIR coefficient registers, and FIR coefficient registers;

the IIR delay parameter registers (27) for storing IIR delay parameters;

the IIR coefficient registers (26) for storing IIR coefficients;

the FIR coefficient registers (31) for storing FIR coefficients;

a data buffer (28) for storing digitized data;

means for performing an IIR MAC operation (29) for IIR with registers (30) for keeping track of intermediate pipeline values; and means for performing an FIR MAC operation (32) for FIR with coefficients supplied from FIR coefficient registers (31) and data selected from the head of the data buffer (28), together with registers (33) for keeping track of the intermediate pipeline values.

* * * * *